United States Patent
Hague et al.

(10) Patent No.: US 12,362,662 B2
(45) Date of Patent: Jul. 15, 2025

(54) COMMUTATION ASSISTANCE BY CONTROLLING THE SHAPE OF THE CURRENT WAVE IN A BIDIRECTIONAL TOTEM POLE CONVERTER

(71) Applicant: STMicroelectronics International N.V., Geneva (CH)

(72) Inventors: Yannick Hague, Mettray (FR); Romain Launois, Tours (FR); Guillaume Thiennot, Pernay (FR)

(73) Assignee: STMicroelectronics International N.V., Geneva (CH)

(*) Notice: Subject to any disclaimer, the term of this patent is extended or adjusted under 35 U.S.C. 154(b) by 64 days.

(21) Appl. No.: 18/203,299

(22) Filed: May 30, 2023

(65) Prior Publication Data
US 2024/0405670 A1    Dec. 5, 2024

(51) Int. Cl.
*H02M 1/42*    (2007.01)
*H02M 1/00*    (2006.01)
*H02M 1/08*    (2006.01)

(52) U.S. Cl.
CPC ....... *H02M 1/4233* (2013.01); *H02M 1/0085* (2021.05); *H02M 1/081* (2013.01)

(58) Field of Classification Search
CPC .. H02M 1/4233; H02M 1/425; H02M 1/4258; H02M 1/42; H02M 1/0085;
(Continued)

(56) References Cited

U.S. PATENT DOCUMENTS

| | | |
|---|---|---|
| 2015/0131343 A1 | 5/2015 | Hufnagel et al. |
| 2016/0373021 A1 | 12/2016 | Gonthier |

(Continued)

FOREIGN PATENT DOCUMENTS

| | | |
|---|---|---|
| CN | 112054665 A | 12/2020 |
| CN | 113726135 A | 11/2021 |
| EP | 3422554 A1 | 1/2019 |

OTHER PUBLICATIONS

Infineon, "3300 W CCM bi-directional totem pole with 650 V CoolSiC(tm) and XMC(tm)," Jan. 14, 2020, http://www.infineon.com/eval-3k3w-tp-pfc-sic, 34 pgs.

TI Designs: TIDA-01604, "98.6% Efficiency, 6.6-kW Totem-Pole PFC Reference Design for HEV/EV Onboard Charger," Apr. 2020, 71 pgs.

(Continued)

*Primary Examiner* — Nguyen Tran
(74) *Attorney, Agent, or Firm* — Crowe & Dunlevy LLC

(57) ABSTRACT

A bidirectional PFC system includes a high-frequency branch with a first transistor connected between an IO node and a high-frequency tap, and a second transistor connected between the high-frequency tap and a reference node, and a low-frequency branch with a first thyristor connected between the IO node and a low-frequency tap, and a second thyristor connected between the low-frequency tap and the reference node. An inductor is connected between the first node and the high-frequency tap. A first capacitor is connected between the first node and the low-frequency tap. The first node and the low-frequency tap are coupled to input terminals. A control circuit generates first and second gate drive signals for the transistors so as to modify an AC signal at the input terminals such that the AC current falls below a holding current of the second thyristor prior to zero crossing of the AC voltage.

15 Claims, 8 Drawing Sheets

(58) Field of Classification Search
CPC .... H02M 1/0083; H02M 1/081; H02M 1/082; H02M 1/083; H02M 1/08
See application file for complete search history.

(56) References Cited

U.S. PATENT DOCUMENTS

| | | | |
|---|---|---|---|
| 2017/0324350 | A1 | 11/2017 | Gonthier et al. |
| 2019/0006959 | A1* | 1/2019 | Benabdelaziz ......... H02M 7/81 |
| 2019/0006960 | A1 | 1/2019 | Benabdelaziz |
| 2020/0381992 | A1 | 12/2020 | Gonthier |
| 2020/0403525 | A1* | 12/2020 | Miyazaki ............ H02M 1/0085 |
| 2021/0135590 | A1 | 5/2021 | Hague et al. |
| 2021/0336533 | A1* | 10/2021 | Benabdelaziz ......... H02M 7/12 |
| 2022/0103062 | A1 | 3/2022 | Benabdelaziz et al. |
| 2022/0255453 | A1 | 8/2022 | Nakata et al. |
| 2022/0360190 | A1 | 11/2022 | Gonthier |
| 2023/0074505 | A1 | 3/2023 | Hague et al. |

OTHER PUBLICATIONS

NXP Semiconductors: "Totem-Pole Bridgeless PFC Design Using MC56F82748," Document No. DRM174, Nov. 2016, 43 pgs.

STMicroelectronics: "Totem-Pole PFC Reference Design With SiC Technology," Jul. 3, 2020, XP055923299, 25 pgs.

Transphorm : TDTTP3300—RD 3.3KW Bridgeless Totem-Pole PFC, Feb. 28, 2018, pp. 1-24, XP093214244.

Vu Trong Tue et al. Title: 99% Efficiency 3-Level Bridgeless Totem-pole PFC Implementation with Low-voltage Silicon at Low Cost 2019 IEEE Applied power electronics conference and exposition (APEC), IEEE, Mar. 17, 2019, pp. 2077-2083.

Lei Jing, Xiaoqing Wang et al. Title : An Optimized Control Strategy to Improve the Current Zero-Crossing Distortion in Bidirectional AC/DC Converter based on V2G Concept. The 2018 International Power Electronics Conference (IPEC-NIIGATA 2018—ECCE ASIA), May 20, 2018, pp. 878-882.

\* cited by examiner

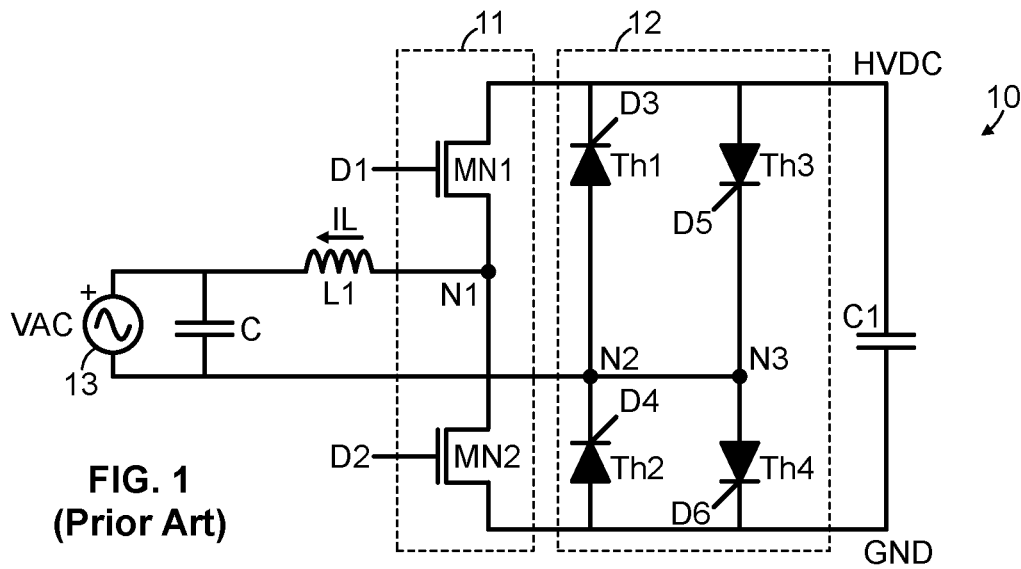
FIG. 1 (Prior Art)
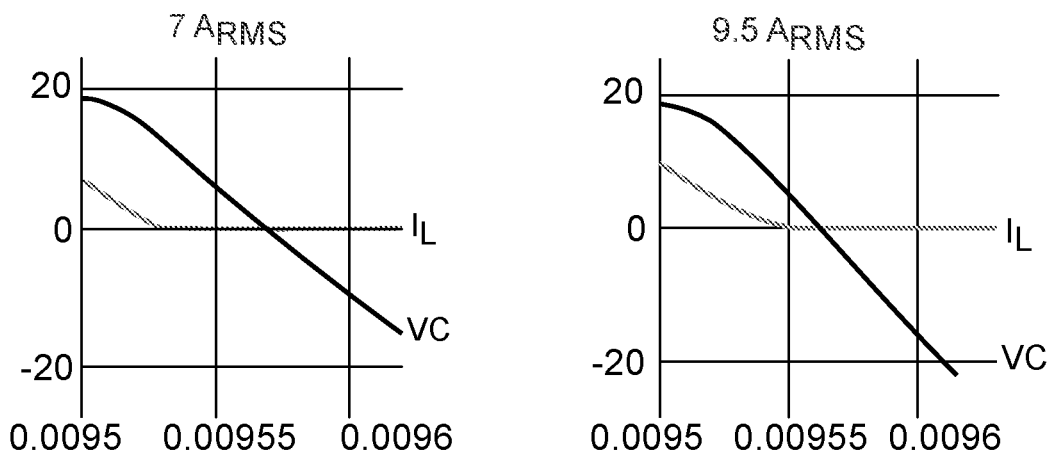
FIG. 2 (Prior Art)    FIG. 3 (Prior Art)
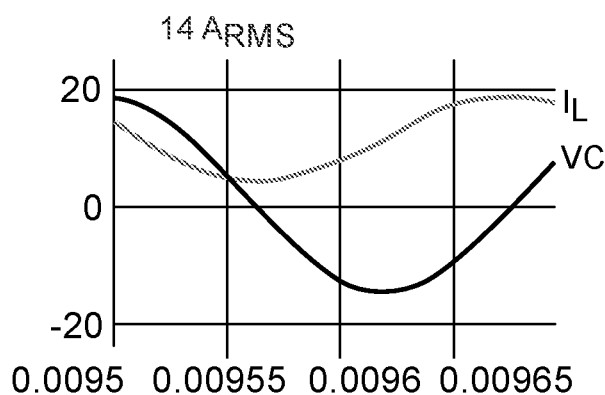
FIG. 4 (Prior Art)

COMMUTATION ASSISTANCE BY CONTROLLING THE SHAPE OF THE CURRENT WAVE IN A BIDIRECTIONAL TOTEM POLE CONVERTER

TECHNICAL FIELD

This disclosure relates generally to power electronics and, more specifically, to bidirectional totem pole power factor correction (PFC) converters with commutation assistance provided via control of the shape of the input voltage/current wave.

BACKGROUND

Power factor correction (PFC) is technique utilized in power electronics systems to minimize the phase difference between voltage and current waveforms, in turn reducing losses in power distribution networks and enhancing the overall efficiency of the system.

Bidirectional totem pole PFC converters are specialized devices that perform power factor correction while also providing bidirectional power flow capability. In addition to their function of power factor correction, bidirectional totem pole PFC converters can also operate in inverter mode in which the bidirectional totem pole PFC converter processes power from a DC source and generates an AC output voltage waveform suitable for supplying AC loads or injecting power into the grid.

A conventional bidirectional totem pole PFC 10 is shown in FIG. 1. The totem pole PFC 10 includes an inductor L1 connected between a node N1 and the positive terminal of an AC source 13. The negative terminal of the AC source 13 is connected to a node N2. A filtering capacitor C is connected in parallel with the AC source 13. An n-channel transistor MN1 has its drain connected to node HVDC, its source connected to node N1, and its gate driven by a gate drive signal D1. Another n-channel transistor MN2 has its drain connected to node N1, its source connected to ground, and its gate driven by a gate drive signal D2. The n-channel transistors MN1 and MN2 form a high frequency branch 11.

A first thyristor Th1 has its cathode connected to node HVDC, its anode connected to node N2, and its cathode gate connected to a gate drive signal D3. A second thyristor Th2 has its cathode connected to node N2, its anode connected to ground, and its cathode gate driven by a gate drive signal D4. A third thyristor Th3 has its anode connected to node HVDC, its cathode connected to node N3, and its cathode gate driven by a gate drive signal D5. A fourth thyristor Th4 has its anode connected to node N3, its cathode connected to ground, and its cathode gate driven by a gate drive signal D6. Node N2 is connected to node N3. The thyristors Th1, Th2, Th3, and Th4 form a low frequency branch 12. Although the thyristors are illustrated as cathode-gated devices, it will be understood that anode-gated thyristors could instead be used.

A capacitor C1 is connected between node HVDC and ground, providing energy storage and filtering for the converter. The transistors MN1 and MN2 of the high-frequency branch are responsible for shaping the current waveform to achieve the desired power factor and maintain control loop stability. The thyristors Th1, Th2, Th3, and Th4 of the low-frequency branch primarily handle the majority of the power transfer and reduce conduction losses.

A problem arises with the conventional bidirectional totem pole PFC 10 during the zero-crossing of the AC waveform. At the zero-crossing point, it is desired for the thyristor Th3/Th4 to be turned off, allowing the AC waveform to transition smoothly between its half-cycles. However, for a thyristor to turn off, the current through the thyristor must fall below its holding current, typically at or near zero. In the case of positive polarity, if the current through thyristor Th4 does not fall below the holding current before the voltage waveform switches polarity, thyristor Th4 remains in the conducting state, leading to an undesired current flow.

This unintended current flow occurs when thyristor Th4 stays on during the zero-crossing of the AC waveform. The current path starts from the AC source 13, continues to node N3, flows through thyristor Th4, returns through the ground rail, and moves through the body diode of transistor MN2 and inductor L1 before reaching the AC source 13 again. This unintended current flow can potentially cause damage to transistor MN2 and other components, affecting the overall efficiency, reliability, and performance of the bidirectional totem pole PFC converter 10.

Graphs of the inductor current IL and AC waveform voltage VC across the filtering capacitor C during operation without issues are shown in FIGS. 2-3. In both cases, it can be observed that the inductor current IL (representative of the current through thyristor Th4) falls to zero prior to the zero-crossing of the AC waveform VC. As such, observe that the inductor current IL remains at zero during the negative portion of the AC voltage waveform.

However, in FIG. 4, the inductor current IL does not fall to zero prior to the zero-crossing of the AC waveform VC. As a result, the current flow situation described above occurs, and the inductor current IL rises during the negative portion of the AC voltage waveform. Since this current is flowing through the body diode of transistor MN2 as described earlier, damage may occur.

One known method to address this problem is to introduce or adjust the dead time in the control of the transistors MN1 and MN2 before the zero-crossing of the AC waveform. Dead time refers to the intentional delay between turning off of the transistors MN1 and MN2 and the reversal of the AC waveform polarity. By ceasing the switching of the transistors MN1 and MN2, the dead time allows the current through thyristor Th4 to fall below its holding current, providing for a proper zero-crossing of the current before the reversal of the AC waveform polarity.

A drawback of using dead time to address the zero-crossing issue is its impact on the Total Harmonic Distortion (THD), which is a measure of the distortion of the output voltage or current waveform compared to an ideal waveform. The longer the dead time, the higher the THD, as the output waveform deviates more significantly from the ideal sinusoidal shape during the non-conducting period. This increased THD can lead to diminished power quality, reduced system efficiency, and potential interference with other devices or systems connected to the same power grid and is therefore undesirable.

Given this, a need remains for an enhanced approach to commutation assistance that improves the performance of bidirectional totem pole PFC systems, providing a smooth transition during the zero-crossing of the AC waveform without the drawbacks associated with the dead time approach described above.

SUMMARY

Disclosed herein is a bidirectional power factor correction system, including a high-frequency branch and a low-frequency branch. The high-frequency branch includes a first transistor connected between an IO node and a high-frequency tap, and a second transistor connected between the high-frequency tap and a reference node. The low-frequency branch includes a first thyristor connected between the IO node and a low-frequency tap, and a second thyristor connected between the low-frequency tap and the reference node. An inductor is connected between the first node and the high-frequency tap. A first capacitor is connected between the first node and the low-frequency tap. The first node and the low-frequency tap are coupled to input terminals. A control circuit is configured to generate first and second gate drive signals for the power devices of the high-frequency branch so as to modify an AC signal at the input terminals such that an AC current of the AC signal falls below a holding current of the second thyristor prior to a zero crossing of an AC voltage of the AC signal at the input terminals.

The control circuit modifies the AC signal by either generating the first and second gate drive signals so as to accelerate a decrease of an AC current waveform at the input terminals after a peak of a half-cycle of the AC current waveform so that the AC current waveform falls below a holding current of the second thyristor prior to a zero crossing of an AC voltage waveform at the input terminals, or generating the first and second gate drive signals so as to create a plateau in an AC voltage waveform at the input terminals for a given period of time after a peak of a half-cycle of the AC voltage waveform so that the AC voltage waveform does not zero cross prior to an AC current waveform at the input terminals falls below a holding current of the second thyristor.

The control circuit may be configured to accelerate the decrease of the AC current waveform after the peak of the half-cycle of the AC current waveform by comparing a digital reference current to a digital feedback current and generating the first and second gate drive signals based thereupon so that the digital feedback current matches the digital reference current, the digital feedback current being based upon the AC current waveform, or create the plateau in an AC voltage waveform at the input terminals for the given period of time after the peak of the half-cycle of the AC voltage waveform by generating the first and second gate drive signals to cause the first and second transistors to apply an assist voltage to the AC voltage waveform during the given period of time.

The control circuit may be configured to create the plateau in an AC voltage waveform at the input terminals for the given period of time after the peak of the half-cycle of the AC voltage waveform by comparing a digital reference voltage to a digital feedback voltage and generating the first and second gate drive signals based thereupon so that the digital feedback voltage matches the digital reference voltage, the digital feedback voltage being based upon the AC voltage waveform.

The control circuit may include a controller configured to generate the digital reference current based upon stored data or generate the digital reference voltage based upon stored data, a current comparator configured to generate a comparison signal based upon comparing the digital reference current to the digital feedback current or generate a comparison signal based upon comparing the digital reference voltage to the digital feedback voltage, a fast proportional-integral controller configured to generate a PWM control signal based upon the comparison signal, a pulse width modulation (PWM) circuit configured to generate gate pre-drive signals based upon the PWM control signal, a gate driving circuit configured to generate the first and second gate drive signals based upon the gate pre-drive signals, a scaling circuit configured to scale the AC current waveform to produce a scaled waveform, and an analog to digital converter configured to digitize the scaled waveform to produce the digital feedback current or the digital feedback voltage.

The control circuit may be further configured to generate third and fourth gate drive signals for the first and second thyristors.

Also disclosed herein is a bidirectional power factor correction system, including a high-frequency branch and a low frequency branch. The high frequency branch includes a first transistor connected between an IO node and a high-frequency tap, and a second transistor connected between the high-frequency tap and a reference node. The low-frequency branch includes a first thyristor connected between the IO node and a low-frequency tap, and a second thyristor connected between the low-frequency tap and the reference node. An inductor is connected between the first node and the high-frequency tap. A first capacitor is connected between the first node and the low-frequency tap. The first node and the low-frequency tap are coupled to input terminals. A control circuit is configured to generate first and second gate drive signals for the first and second transistors so as to accelerate a decrease of an AC current waveform at the input terminals after a peak of a half-cycle of the AC current waveform so that the AC current waveform falls below a holding current of the second thyristor prior to a zero crossing of an AC voltage waveform at the input terminals.

The control circuit may be configured to accelerate the decrease of the AC current waveform after the peak of the half-cycle of the AC current waveform by comparing a digital reference current to a digital feedback current and generating the first and second gate drive signals based thereupon so that the digital feedback current matches the digital reference current, the digital feedback current being based upon the AC current waveform.

The control circuit may include a controller configured to generate the digital reference current based upon stored data, a current comparator configured to generate a comparison signal based upon comparing the digital reference current to the digital feedback current, a fast proportional-integral controller configured to generate a PWM control signal based upon the comparison signal, a pulse width modulation (PWM) circuit configured to generate gate pre-drive signals based upon the PWM control signal, a gate driving circuit configured to generate the first and second gate drive signals based upon the gate pre-drive signals, a scaling circuit configured to scale the AC current waveform to produce a scaled waveform, and an analog to digital converter configured to digitize the scaled waveform to produce the digital feedback current.

The control circuit may be further configured to generate third and fourth gate drive signals for the first and second thyristors.

Further disclosed herein is a bidirectional power factor correction system, including a high-frequency branch and a low-frequency branch. The high-frequency branch includes a first transistor connected between an IO node and a high-frequency tap, and a second transistor connected between the high-frequency tap and a reference node. The low-frequency branch includes a first thyristor connected between the IO node and a low-frequency tap, and a second thyristor connected between the low-frequency tap and the reference node. An inductor is connected between the first node and the high-frequency tap. A first capacitor is connected between the first node and the low-frequency tap. The first node and the low-frequency tap are coupled to input terminals. A control circuit is configured to generate first and second gate drive signals for the first and second transistors so as to create a plateau in an AC voltage waveform at the input terminals for a given period of time after a peak of a half-cycle of the AC voltage waveform so that the AC voltage waveform does not zero cross prior to an AC current waveform at the input terminals falls below a holding current of the second thyristor.

The control circuit may be configured to create the plateau in an AC voltage waveform at the input terminals for the given period of time after the peak of the half-cycle of the AC voltage waveform by generating the first and second gate drive signals to cause the first and second transistors to apply an assist voltage to the AC voltage waveform during the given period of time.

The control circuit may be configured to create the plateau in an AC voltage waveform at the input terminals for the given period of time after the peak of the half-cycle of the AC voltage waveform by comparing a digital reference voltage to a digital feedback voltage and generating the first and second gate drive signals based thereupon so that the digital feedback voltage matches the digital reference voltage, the digital feedback voltage being based upon the AC voltage waveform.

The control circuit may include a controller configured to generate the digital reference voltage based upon stored data, a current comparator configured to generate a comparison signal based upon comparing the digital reference voltage to the digital feedback voltage, a fast proportional-integral controller configured to generate a PWM control signal based upon the comparison signal, a pulse width modulation (PWM) circuit configured to generate gate pre-drive signals based upon the PWM control signal, a gate driving circuit configured to generate the first and second gate drive signals based upon the gate pre-drive signals, a scaling circuit configured to scale the AC voltage waveform to produce a scaled waveform, and an analog to digital converter configured to digitize the scaled waveform to produce the digital feedback voltage.

The control circuit may be further configured to generate third and fourth gate drive signals for the first and second thyristors.

BRIEF DESCRIPTION OF THE DRAWINGS

FIG. 1 is a schematic diagram of a conventional bidirectional totem pole PFC system.

FIG. 2 is a graph illustrating the AC current waveform in the conventional bidirectional totem pole PFC system of FIG. 1 when operating at a first current level.

FIG. 3 is a graph illustrating the AC current waveform in the conventional bidirectional totem pole PFC system of FIG. 1 when operating at a second current level.

FIG. 4 is a graph illustrating the AC current waveform in the conventional bidirectional totem pole PFC system of FIG. 1 when operating at a third current level.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 5:
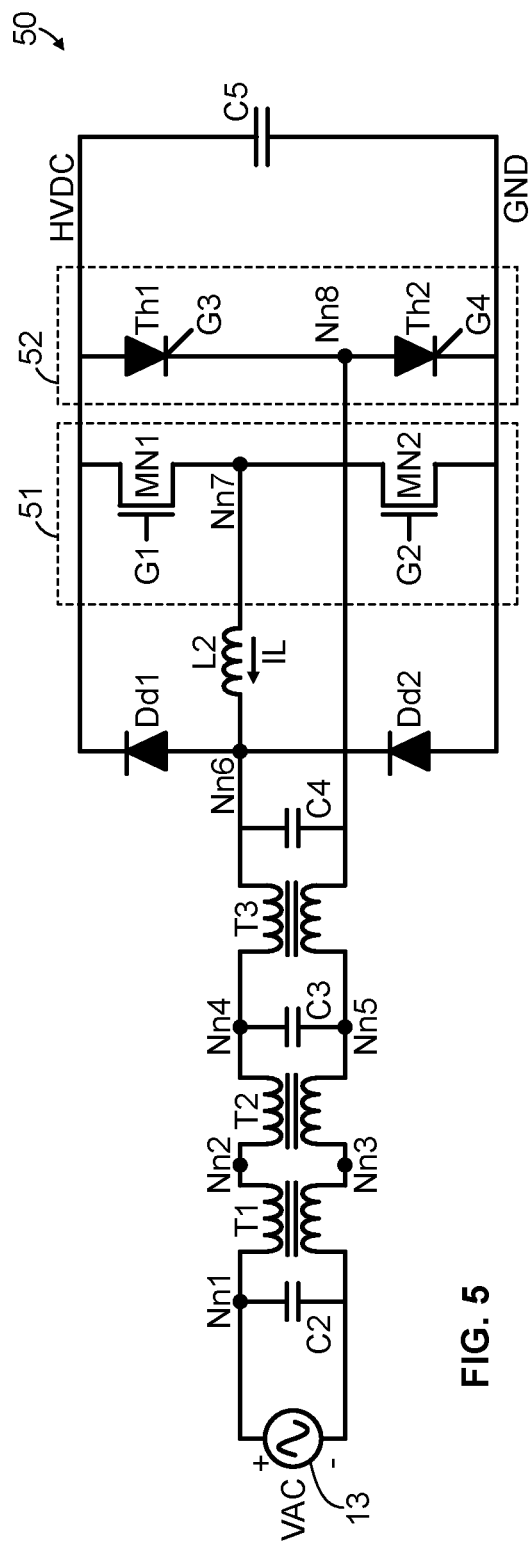
FIG. 5 is a schematic diagram of a bidirectional totem pole PFC system disclosed herein.

Now described with reference to FIG. 5 is a bidirectional totem pole PFC system 50 including an enhanced approach to commutation assistance. The totem pole PFC system 50 includes a high frequency branch 51 and low frequency branch 52 connected between node HVDC and ground. The high frequency branch 51 is formed by an n-channel transistor MN1 having its drain connected to node HVDC, its source connected to node Nn7, and its gate coupled to be controlled by a gate drive signal G1, and an n-channel transistor MN2 having its drain connected to node Nn7, its source connected to ground, and its gate coupled to be controlled by gate drive signal G2. The low frequency branch 52 is formed by a first thyristor Th1 having its anode connected to node HVDC, its cathode connected to node Nn8, and its cathode gate coupled to be controlled by gate drive signal G3, and a second thyristor Th2 having its anode connected to node Nn8, its cathode connected to ground, and its cathode gate coupled to be controlled by gate drive signal G4. A capacitor C5 is connected between node HVDC and ground. Although the thyristors are illustrated as cathode-gated devices, it will be understood that anode-gated thyristors could instead be used.

An inductor L2 is connected between notes Nn7 and Nn6. A bypass diode Dd1 has its cathode connected to node HVDC and its anode connected to node Nn6, while a bypass diode Dd2 has its cathode connected to node Nn6 and its anode connected to ground.

An AC source 13 has its positive terminal connected to node Nn1 and its negative terminal connected to a second terminal of a capacitor C2. The second terminal of the resistor R2 and the first terminal of the capacitor C2 are connected to node Nn1. A common mode inductor T1 has its primary winding connected between nodes Nn1 and Nn2 and has its secondary winding connected between the negative terminal of the AC source 13 and node Nn3. A common mode inductor T2 has its primary winding connected between nodes Nn2 and Nn4 and its secondary winding connected between nodes Nn3 and Nn5. A capacitor C3 is connected between nodes Nn4 and Nn5. A common mode inductor T3 has its primary winding connected between nodes Nn4 and Nn6 and its secondary winding connected between nodes Nn5 and Nn8. A capacitor C4 is connected between nodes Nn6 and Nn8.

The common mode inductor T1, T2, and T3 and the capacitors C2, C3, and C4 serve various functions within the bidirectional totem pole PFC system 50, such as filtration, noise protection, and smoothing of voltage waveforms across the thyristors Th1 and Th2.

Recall the potential issue of the current through the thyristor Th1/Th2 failing to fall below the holding current before the switching of the AC voltage waveform. In order to address this, two approaches can be considered: modifying the AC current waveform or modifying the AC voltage waveform. Both methods involve making adjustments in the control of transistors MN1 and MN2.

Figure 6:
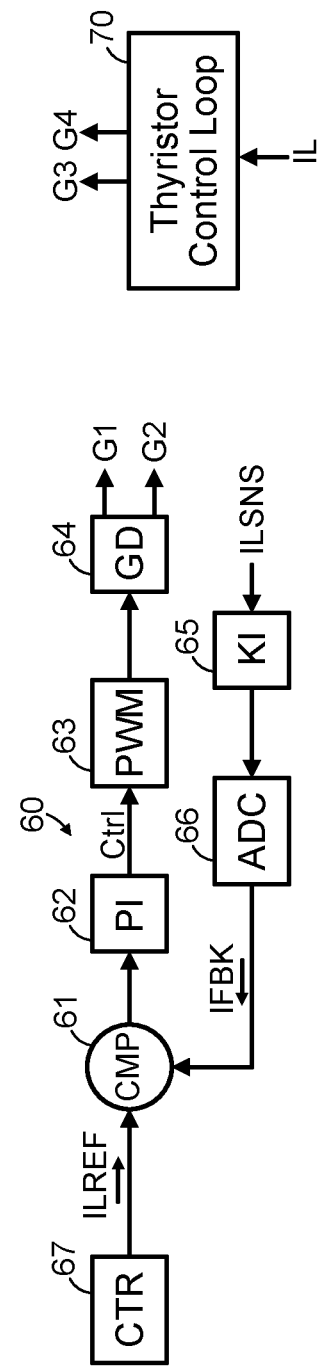
FIG. 6 is a block diagram of a first control loop for the system of FIG. 5 disclosed herein.

First, the modification of the AC current waveform will be discussed in the context of which the system 50 is operating in inverter mode and providing power to the grid. In the embodiment illustrated in FIG. 6, the first control loop 60 generates the gate drive signals G1 and G2 to control the transistors MN1 and MN2, and a second control loop 70 generates the gate drive signals G3 and G4 for the thyristors Th1 and Th2.

The first control loop 60 includes a current comparator 61, which receives as input a reference current ILREF (a digital value representing the desired AC current level, generated by a controller 67 based upon a stored table) and a feedback current IFBK (a digital value representing the actual inductor current IL). The output of the current comparator 61 is provided to a fast proportional-integral (PI) controller 62. The PI controller 62 adjusts the control signal Ctrl it outputs based on the output of the current comparator 61, i.e., based on the error between the reference current ILREF and the feedback current IFBK. The PI controller 62 quickly responds to changes in the actual inductor current IL, which is used to generate the feedback current IFBK. The control signal Ctrl is received by a pulse width modulation (PWM) generator 63, which generates appropriate switching signals for the transistors MN1 and MN2. These switching signals are received by a gate driver 64 for the transistors MN1 and MN2, which drives the transistors MN1 and MN2 accordingly. To close the loop, the inductor current IL is received through a current scaling block (KI) 65, which senses and scales the inductor current IL (ILSNS being the sensed current) by a scaling factor K. The scaled inductor current is then digitized by an analog-to-digital converter (ADC) 66 to produce the feedback current IFBK.

Figure 7:
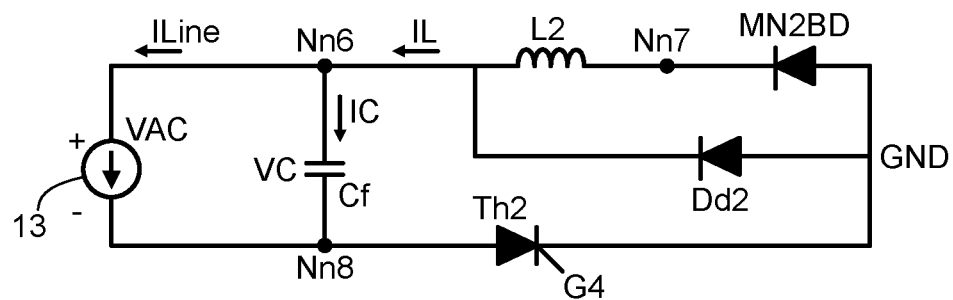
FIG. 7 is a circuit model of the system of FIG. 5 in a condition in which transistors are turned off before the reversal of the AC waveform polarity.

Generation of the table stored in the controller 67 and used to generate the reference current ILREF is now described. Refer to the model of the bidirectional totem pole PFC system 50 shown in FIG. 7. This model represents the current path that would occur when the transistors MN1 and MN2 are turned off before the zero crossing of the AC waveform. Note that the diode labeled MN2BD represents the body diode of transistor MN2, and that the AC source 13 here is represented as a current source. Current IL represents the current through the inductor L2, current IC represents the current into the filtering capacitors C2, C3 and C4 (collectively labeled as capacitor Cf in FIG. 7), and current ILine represents the current returning to the AC source 13.

Keeping this in mind, the voltage $v_c$, the voltage across filtering capacitors C2, C3 and C4, can be calculated as:

$$v_C(t) = \lambda \cos\frac{t}{\sqrt{LC}} + \mu \sin\frac{t}{\sqrt{LC}} + \frac{I_{LINE(RMS)}\sqrt{2}\cdot\omega}{C\omega^2 - \frac{1}{L}}\cos(\omega t)$$

where: L is the inductance of the inductor L2, C is the capacitance of the filtering capacitor C2, C3 and C4, $t_{OFF}$ is the time between the turn off of the transistors MN1 and MN2 and the zero crossing of the AC waveform, and the values of $\lambda$ and $\mu$ are calculated from initial conditions.

The current $i_L$ through the inductor L2 can be calculated as:

$$i_L(t) = I_{LINE(RMS)}\sqrt{2}\sin(\omega t) - \frac{C\cdot\lambda}{\sqrt{LC}}\sin\left(\frac{t}{\sqrt{LC}}\right) + \frac{C\cdot\mu}{\sqrt{LC}}\cos\left(\frac{t}{\sqrt{LC}}\right) - \frac{C\cdot I_{LINE(RMS)}\sqrt{2}\cdot\omega^2}{C\omega^2 - \frac{1}{L}}\sin(\omega t)$$

The value $\mu$ can be calculated as:

$$\mu = \frac{1}{\frac{\sin^2\left(\frac{t_{OFF}}{\sqrt{LC}}\right)}{\sqrt{LC}\cos\left(\frac{t_{OFF}}{\sqrt{LC}}\right)} + \frac{\cos\left(\frac{t_{OFF}}{\sqrt{LC}}\right)}{\sqrt{LC}}}\cdot\left[-\frac{\sin\left(\frac{t_{OFF}}{\sqrt{LC}}\right)I_{LINE(RMS)}\sqrt{2}\cdot\omega}{\sqrt{LC}\cos\left(\frac{t_{OFF}}{\sqrt{LC}}\right)\left(C\omega^2-\frac{1}{L}\right)}\right.$$
$$\cos(\omega t_{OFF}) + \frac{\sin\left(\frac{t_{OFF}}{\sqrt{LC}}\right)V_{AC(RMS)}\sqrt{2}}{\sqrt{LC}\cos\left(\frac{t_{OFF}}{\sqrt{LC}}\right)}\sin(\omega t_{OFF}) +$$
$$\left.\frac{I_{LINE(RMS)}\sqrt{2}\,\omega^2}{C\omega^2-\frac{1}{L}}\sin(\omega t_{OFF}) + V_{AC(RMS)}\sqrt{2}\cdot\omega\cos(\omega t_{OFF})\right]$$

The value $\lambda$ can be calculated as:

$$\lambda = \frac{1}{\cos\left(\frac{t_{OFF}}{\sqrt{LC}}\right)}\cdot\left[-\mu\sin\frac{t_{OFF}}{\sqrt{LC}} - \frac{I_{LINE(RMS)}\sqrt{2}\cdot\omega}{C\omega^2-\frac{1}{L}}\cos(\omega t_{OFF}) +\right.$$
$$\left. V_{AC(RMS)}\sqrt{2}\sin(\omega t_{OFF})\right]$$

Using the equations derived for $v_c(t)$ and $i_L(t)$, as well as the calculated values of $\lambda$ and $\mu$, the controller 67 can determine the appropriate reference current waveform shape to avoid the issue of the current through Th2 failing to fall below its holding current before the zero crossing of the AC waveform. By adjusting the gate drive signals G1 and G2 for the transistors MN1 and MN2 based on the analysis of the mathematical model and determination of the values of λ and μ, the controller 67 can control the AC current waveform such that the current experiences an accelerated decrease towards the end of the half-cycle and maintains a zero current level for a small duration, known as the dead time.

Figure 8:
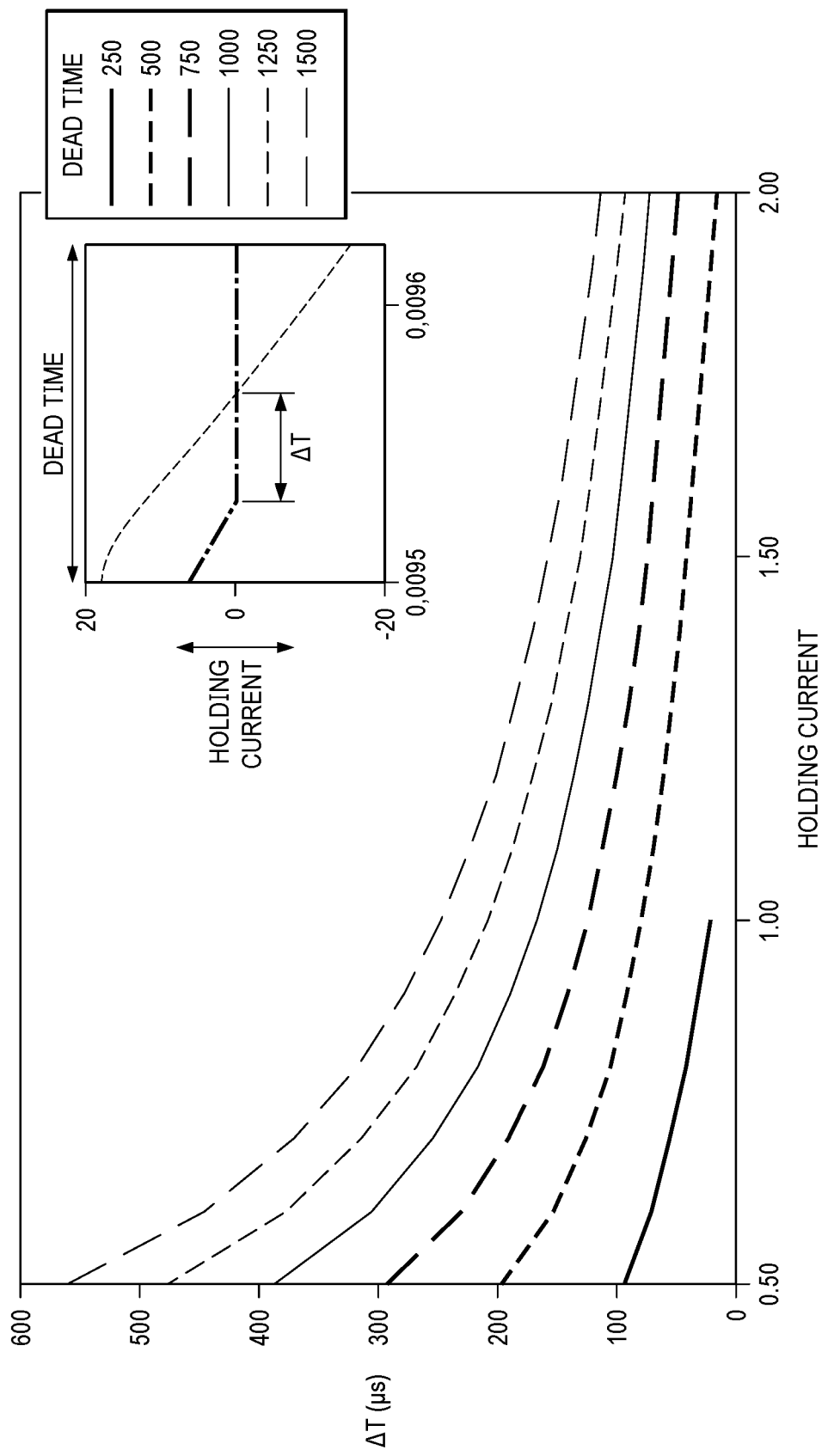
FIG. 8 is a series of graphs showing the relationship between the safety margin of FIG. 5 in operation and the holding current and dead time.

The controller 67 creates a table containing the reference current values that correspond to the desired current waveform shape, taking into account a chosen safety margin ΔT. The safety margin ΔT is the time between the AC current hitting zero and the AC voltage hitting zero, and it is determined based on the desired dead time and the holding current of the thyristor Th2. A greater safety margin provides more time for the current through Th2 to fall below its holding current, providing for a more reliable turn-off, while a smaller safety margin allows for a faster transition to the negative portion of the AC voltage waveform, potentially improving overall efficiency. The effect of dead time and holding current on the safety margin ΔT can be observed in FIG. 8—observe that the safety margin ΔT decreases as the current increases for example.

Therefore, the safety margin ΔT is appropriately chosen to provide for reliable operation while helping to minimize total harmonic distortion (THD) so that the system can achieve stable and efficient performance with low impact on power quality. The safety margin ΔT is therefore chosen to be as small as possible while still providing a sufficient buffer (to account for transients, non-ideality in the transistors, etc.) for the current through Th2 to fall below its holding current before the negative portion of the AC voltage waveform.

Once the table is generated, it is stored within the controller 67. The controller then uses this table to generate the reference current ILREF during the operation of the bidirectional totem pole PFC system 50. The reference current ILREF is input to the current comparator 61, where it is compared with the feedback current IFBK, and the error between them is used by the fast proportional-integral (PI) controller 62 to adjust the control signal Ctrl. This control signal is then used by the PWM generator 63 to produce appropriate switching signals for the transistors MN1 and MN2, allowing the system to achieve the desired current waveform shape with the adjusted safety margin ΔT.

By implementing this technique, the bidirectional totem pole PFC system 50 can effectively control the AC current waveform to help ensure that Th2 turns off before the negative portion of the AC waveform, providing for efficient and stable operation of the system.

Figure 9:
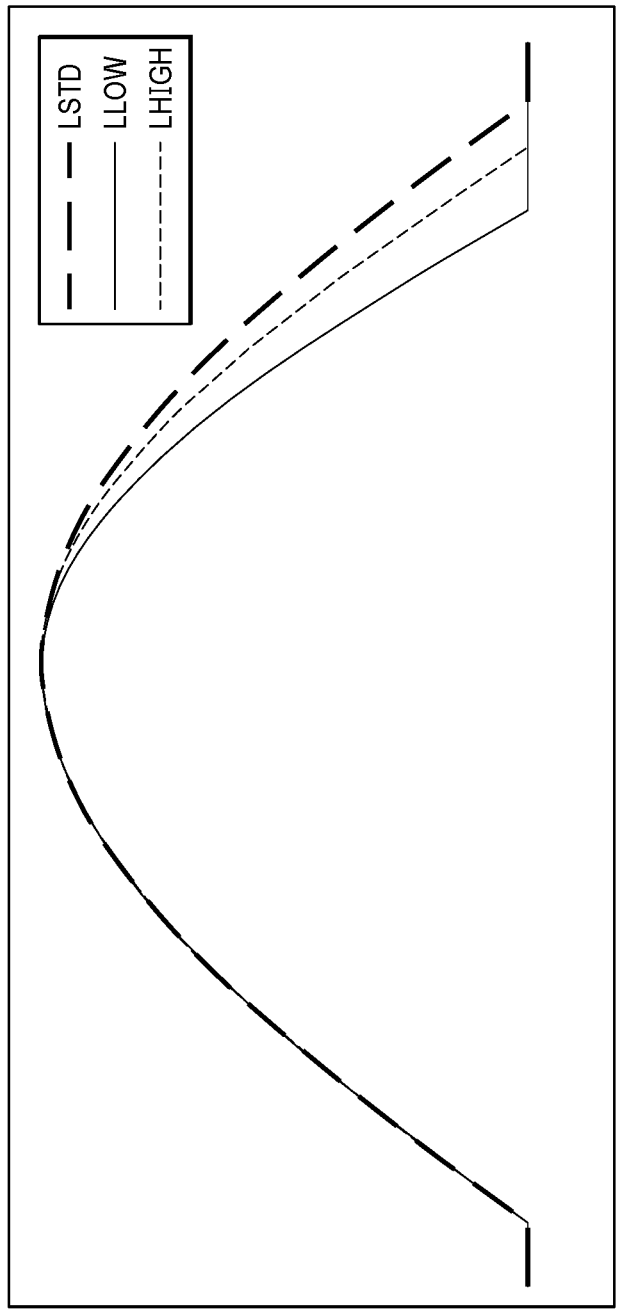
FIG. 9 is a series of graphs showing a comparison between the potential generated reference currents in FIG. 5 and a prior art reference current.

In some embodiments, multiple such tables may be stored within the controller 67. For example, a first table suitable for generating a reference current Ilow suitable for use in a low voltage application (e.g., a grid voltage of 110 V) and a second table suitable for generating a reference current Ihigh suitable for use in a high voltage application (e.g., a grid voltage of 220 V), as shown in FIG. 9. Both of these are shown as compared to a conventional reference current Istd in which the period of the AC waveform does not experience an accelerated decrease towards the end of the positive and negative half-cycle.

Figure 10:
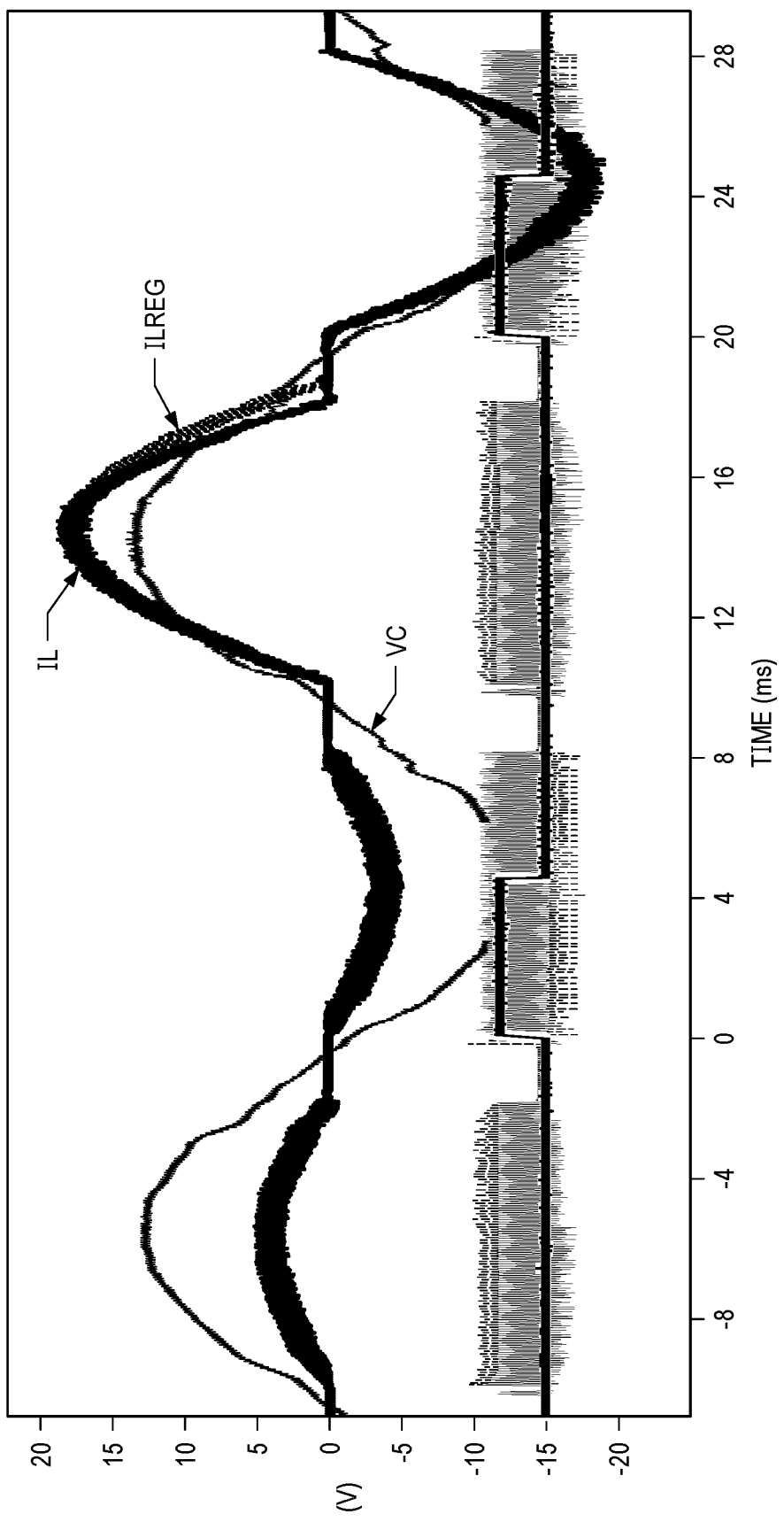
FIG. 10 is a graph showing the effect of the first control loop of FIG. 6 on the AC current waveform.

The inductor current IL generated using this current control technique as compared to a conventionally generated inductor current ILREG and the capacitor voltage VC can be observed in FIG. 10. Note that while the currents IL and ILREG have the same waveform shape up until the peak current, after that peak is reached, current IL experiences an accelerated decrease towards the end of the half-cycle.

Figure 11:
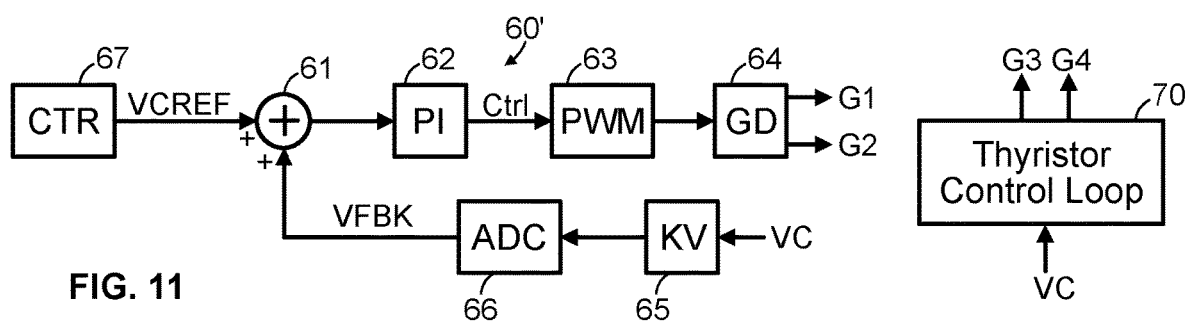
FIG. 11 is a block diagram of a second control loop for the system of FIG. 5 disclosed herein.

Now described with reference to FIG. 11 is an embodiment of the system 50' in which regulation of the feedback loop for the transistors MN1 and MN2 is performed based on voltage when the system 50' is operating in inverter mode and powering a load. In this case, the controller 67 generates a reference voltage waveform, VCREF, instead of a reference current waveform. The voltage control loop 60' compares the actual voltage VC across filtering capacitors C2, C3 and C4 to the reference voltage waveform, VCREF, and generates appropriate control signals to adjust the gate drive signals G1 and G2 for the transistors MN1 and MN2. By doing so, the controller 67 helps ensure that the desired voltage waveform is maintained across filtering capacitors C2, C3 and C4, which in turn influences the current waveform, helping to avoid the issue of the current through Th2 failing to fall below its holding current before the zero crossing of the AC waveform.

The underlying principle of controlling the current decay and incorporating a safety margin is similar to the previous embodiment. The main difference is that the control loop focuses on regulating the voltage across filtering capacitors C2, C3 and C4 instead of the current through inductor L2—rather than modifying the current IL to ensure that it reaches the holding current prior to the negative half of the voltage waveform, the voltage VC is modified to ensure that the negative half of the voltage waveform does not occur prior to the current IL reaching the holding current. This control loop 60' is shown in FIG. 11.

In this case, the controller 67 generates a reference voltage waveform VCREF instead of a reference current waveform. The control loop 60' compares the actual voltage VC across the capacitors to the reference voltage VCREF waveform and generates appropriate control signals to adjust the gate drive signals G1 and G2 for the transistors MN1 and MN2. By doing so, the controller 67 helps ensure that the desired voltage waveform is maintained across the filtering capacitors C2, C3 and C4, which helps avoid the issue of the current IL through Th2 failing to fall below its holding current before the zero crossing of the AC voltage waveform VC by virtue of extending the voltage waveform.

Figure 12:
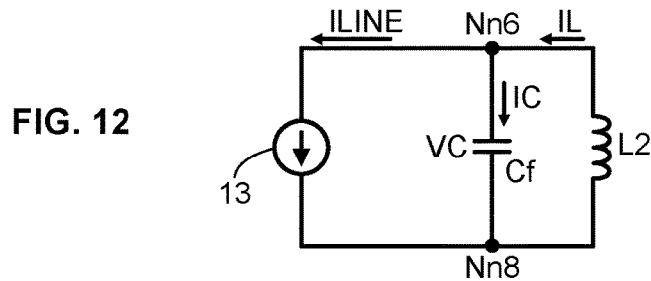
FIG. 12 is a circuit model of the system of FIG. 5 at the peak of the positive half wave of the AC voltage waveform.

A circuit model representing the system 50 at the end of each half voltage sine wave when the transistors MN1 and MN2 are switched off is shown in FIG. 12; this model focuses on the filtering capacitors C2, C3 and C4 (collectively represented as Cf) and inductor L2. Here, an assist voltage $V_{ASSIST}$ (e.g., voltage plateau) to be applied to the AC voltage waveform shortly prior to the switch-off of the transistors MN1 and MN2 at the end of each half voltage sine wave to thereby extend the period of that half voltage sine wave (so that the negative half wave does not begin until the current has fallen below the holding current) may be calculated as:

$$V_{ASSIST} > \frac{i_{AC}(t_{ASSIST}) \cdot e^{\frac{-a \cdot \omega}{b}\left(\frac{T}{2} - t_{ASSIST} - DEADTIME\right)}}{\sqrt{\frac{C}{L}} \cdot \sin\left(\frac{DEADTIME}{\sqrt{LC}}\right) + \frac{1}{a} \cdot e^{\frac{-a \cdot \omega}{b}\left(\frac{T}{2} - t_{ASSIST} - DEADTIME\right)} - \frac{1}{a}}$$

where L is the inductance of the inductor L2, C is the capacitance of filtering capacitors C2, C3 and C4, $t_{ASSIST}$ is the time between the start of the half voltage sine wave and the application of the assist voltage $V_{ASSIST}$.

The value a can be calculated as:

$$a = \frac{V_{AC(RMS)}}{I_{PEAK}} \cdot \frac{\sqrt{2}}{\sqrt{1 + a\tan^2\varphi}}$$

The value b can be calculated as:

$$b = \frac{V_{AC(RMS)}}{I_{PEAK}} \cdot \frac{\sqrt{2} \cdot a \tan\varphi}{\sqrt{1 + a \tan^2\varphi}}$$

Figure 13:
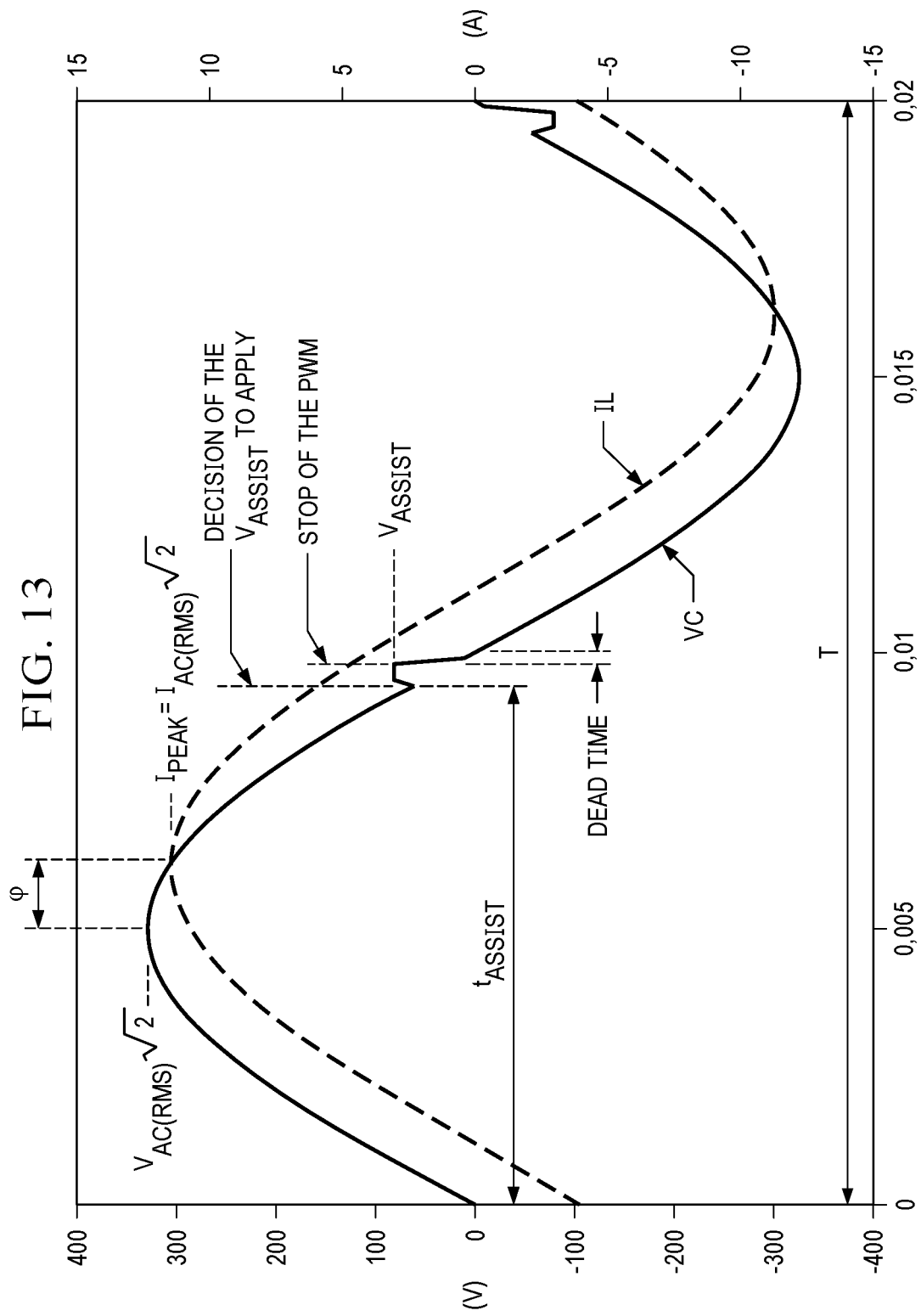
FIG. 13 is a graph showing the effect of the application of the assist voltage to the AC voltage waveform of FIG. 5.

This assist voltage $V_{ASSIST}$ can be observed in FIG. 13.

It is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A bidirectional power factor correction system, comprising:
   a high-frequency branch comprising: a first transistor connected between an IO node and a high-frequency tap, and a second transistor connected between the high-frequency tap and a reference node;
   a low-frequency branch comprising: a first thyristor connected between the IO node and a low-frequency tap, and a second thyristor connected between the low-frequency tap and the reference node;
   an inductor connected between a first node and the high-frequency tap;
   a first capacitor connected between the first node and the low-frequency tap;
   wherein the first node and the low-frequency tap are coupled to input terminals;
   a control circuit configured to generate first and second gate drive signals for the first and second transistors of the high-frequency branch so as to modify an AC signal at the input terminals connected to the first node and the low-frequency tap such that an AC current of the AC signal falls below a holding current of the second thyristor prior to a zero crossing of an AC voltage of the AC signal at the input terminals;
   wherein the control circuit modifies the AC signal by either:
      generating the first and second gate drive signals so as to accelerate a decrease of an AC current waveform at the input terminals after a peak of a half-cycle of the AC current waveform so that the AC current waveform falls below a holding current of the second thyristor prior to a zero crossing of an AC voltage waveform at the input terminals; or
      generating the first and second gate drive signals so as to create a plateau in the AC voltage waveform at the input terminals for a given period of time after a peak of a half-cycle of the AC voltage waveform so that the AC voltage waveform does not zero cross prior to the AC current waveform at the input terminals falls below a holding current of the second thyristor.

2. The bidirectional power factor correction system of claim 1, wherein the control circuit is configured to:
   accelerate the decrease of the AC current waveform after the peak of the half-cycle of the AC current waveform by comparing a digital reference current to a digital feedback current and generating the first and second gate drive signals based thereupon so that the digital feedback current matches the digital reference current, the digital feedback current being based upon the AC current waveform; or
   create the plateau in the AC voltage waveform at the input terminals for the given period of time after the peak of the half-cycle of the AC voltage waveform by generating the first and second gate drive signals to cause the first and second transistors to apply an assist voltage to the AC voltage waveform during the given period of time.

3. The bidirectional power factor correction system of claim 2, wherein the control circuit is configured to create the plateau in the AC voltage waveform at the input terminals for the given period of time after the peak of the half-cycle of the AC voltage waveform by comparing a digital reference voltage to a digital feedback voltage and generating the first and second gate drive signals based thereupon so that the digital feedback voltage matches the digital reference voltage, the digital feedback voltage being based upon the AC voltage waveform.

4. The bidirectional power factor correction system of claim 3, wherein the control circuit comprises:
   a controller configured to: generate the digital reference current based upon stored data or generate the digital reference voltage based upon stored data;
   a current comparator configured to generate a comparison signal based upon: comparing the digital reference current to the digital feedback current or comparing the digital reference voltage to the digital feedback voltage;
   a fast proportional-integral controller configured to generate a pulse width modulation (PWM) control signal based upon the comparison signal;
   a PWM circuit configured to generate gate pre-drive signals based upon the PWM control signal;
   a gate driving circuit configured to generate the first and second gate drive signals based upon the gate pre-drive signals;
   a scaling circuit configured to scale the AC current waveform to produce a scaled waveform; and
   an analog to digital converter configured to digitize the scaled waveform to produce the digital feedback current or the digital feedback voltage.

5. The bidirectional power factor correction system of claim 1, wherein the control circuit is further configured to generate third and fourth gate drive signals for the first and second thyristors.

6. A bidirectional power factor correction system, comprising:
   a high-frequency branch comprising: a first transistor connected between an IO node and a high-frequency tap, and a second transistor connected between the high-frequency tap and a reference node;
   a low-frequency branch comprising: a first thyristor connected between the IO node and a low-frequency tap, and a second thyristor connected between the low-frequency tap and the reference node;
   an inductor connected between a first node and the high-frequency tap;
   a first capacitor connected between the first node and the low-frequency tap;
   wherein the first node and the low-frequency tap are coupled to input terminals connected to the first node and the low-frequency tap; and
   a control circuit configured to generate first and second gate drive signals for the first and second transistors so as to create a plateau in an AC voltage waveform at the input terminals for a given period of time after a peak of a half-cycle of the AC voltage waveform so that the AC voltage waveform does not zero cross prior to an AC current waveform at the input terminals falls below a holding current of the second thyristor.

7. The bidirectional power factor correction system of claim 6, wherein the control circuit is configured to create the plateau in the AC voltage waveform at the input terminals for the given period of time after the peak of the half-cycle of the AC voltage waveform by generating the first and second gate drive signals to cause the first and second transistors to apply an assist voltage to the AC voltage waveform during the given period of time.

8. The bidirectional power factor correction system of claim 7, wherein the control circuit is configured to create the plateau in the AC voltage waveform at the input terminals for the given period of time after the peak of the half-cycle of the AC voltage waveform by comparing a digital reference voltage to a digital feedback voltage and generating the first and second gate drive signals based thereupon so that the digital feedback voltage matches the digital reference voltage, the digital feedback voltage being based upon the AC voltage waveform.

9. The bidirectional power factor correction system of claim 8, wherein the control circuit comprises:
    a controller configured to generate the digital reference voltage based upon stored data;
    a current comparator configured to generate a comparison signal based upon comparing the digital reference voltage to the digital feedback voltage;
    a fast proportional-integral controller configured to generate a pulse width modulation (PWM) control signal based upon the comparison signal;
    a PWM circuit configured to generate gate pre-drive signals based upon the PWM control signal;
    a gate driving circuit configured to generate the first and second gate drive signals based upon the gate pre-drive signals;
    a scaling circuit configured to scale the AC voltage waveform to produce a scaled waveform; and
    an analog to digital converter configured to digitize the scaled waveform to produce the digital feedback voltage.

10. The bidirectional power factor correction system of claim 6, wherein the control circuit is further configured to generate third and fourth gate drive signals for the first and second thyristors.

11. A power factor correction system, comprising:
    an output node and a reference node;
    a high-frequency branch comprising first and second transistors coupled between the output node and the reference node;
    a low-frequency branch comprising first and second thyristors coupled between the output node and the reference node;
    a filtering capacitor coupled to input terminals connected to respective tap nodes of the high-frequency branch and the low-frequency branch; and
    a control circuit configured to:
        generate a reference voltage waveform;
        compare the reference voltage waveform to a feedback voltage across the filtering capacitor;
        generate gate drive signals for the first and second transistors based on the comparison; and
        apply an assist voltage to extend a half-cycle period of an AC voltage waveform at the input terminals, wherein the assist voltage is determined based at least in part on an inductance value, a capacitance value of the filtering capacitor, and a dead time parameter.

12. The power factor correction system of claim 11, wherein the control circuit comprises:
    a voltage comparator configured to generate a comparison signal by comparing the reference voltage waveform to the feedback voltage;
    a proportional-integral controller configured to generate a pulse width modulation control signal based on the comparison signal; and
    a gate driver configured to generate the gate drive signals based on the pulse width modulation control signal.

13. The power factor correction system of claim 11, further comprising an inductor coupled between the high-frequency branch and the input terminals.

14. The power factor correction system of claim 11, wherein the control circuit is configured to:
    store multiple reference voltage waveform tables corresponding to different voltage levels; and
    select one of the multiple reference voltage waveform tables based on an operating condition of the power factor correction system.

15. The power factor correction system of claim 11, wherein the assist voltage creates a plateau in the AC voltage waveform prior to a current through the second thyristor falling below a holding current threshold.

* * * * *